(12) United States Patent
Yokota

(10) Patent No.: US 12,300,277 B1
(45) Date of Patent: May 13, 2025

(54) MAGNETIC DISK APPARATUS AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Toshiyuki Yokota, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/749,450

(22) Filed: Jun. 20, 2024

(30) Foreign Application Priority Data

Jan. 15, 2024 (JP) .................. 2024-003697

(51) Int. Cl.
| | | |
|---|---|---|
| *G11B 20/12* | (2006.01) | |
| *G11B 5/012* | (2006.01) | |
| *G11B 5/09* | (2006.01) | |
| *G11B 5/596* | (2006.01) | |

(52) U.S. Cl.
CPC ............ *G11B 5/012* (2013.01); *G11B 5/09* (2013.01); *G11B 5/59627* (2013.01)

(58) Field of Classification Search
CPC ... G11B 5/012; G11B 5/54; G11B 2005/0001; G11B 2005/0021; G11B 5/09; G11B 5/58; G11B 20/12; G06F 3/0656; G06F 3/0619; G06F 3/0676
USPC ........................................................... 360/48
See application file for complete search history.

(56) References Cited

U.S. PATENT DOCUMENTS

| | | | |
|---|---|---|---|
| 8,879,183 B1 | 11/2014 | Weikal | |
| 10,108,343 B2 | 10/2018 | Liu et al. | |
| 10,528,348 B2 | 1/2020 | Liu et al. | |
| 11,899,968 B2 * | 2/2024 | Miyake | G06F 3/0619 |

* cited by examiner

*Primary Examiner* — Nabil Z Hindi
(74) *Attorney, Agent, or Firm* — Knobbe, Martens, Olson & Bear, LLP

(57) ABSTRACT

According to an embodiment, a controller of a magnetic disk apparatus reads band data from a band area where multiple first tracks are provided. The controller updates the read band data with write data received from a host. When an update portion of the updated band data is not included in data for a head track of the band area, the controller writes, to offset positions, pieces of the updated band data for specified tracks from a track serving as a write destination to an end track. The offset positions are obtained by shifting a position of each of the specified tracks by a predetermined amount in a direction to an end of the band area.

20 Claims, 7 Drawing Sheets

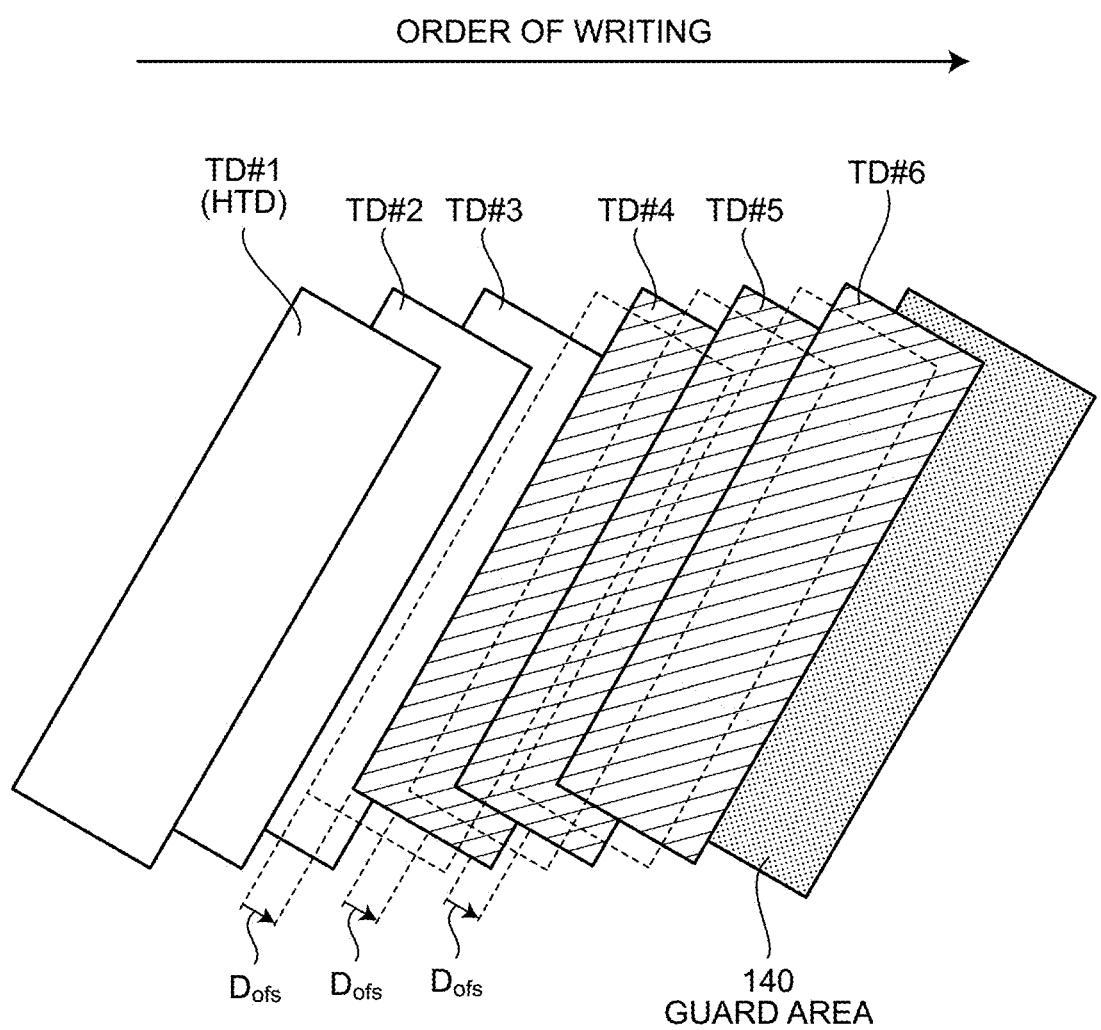

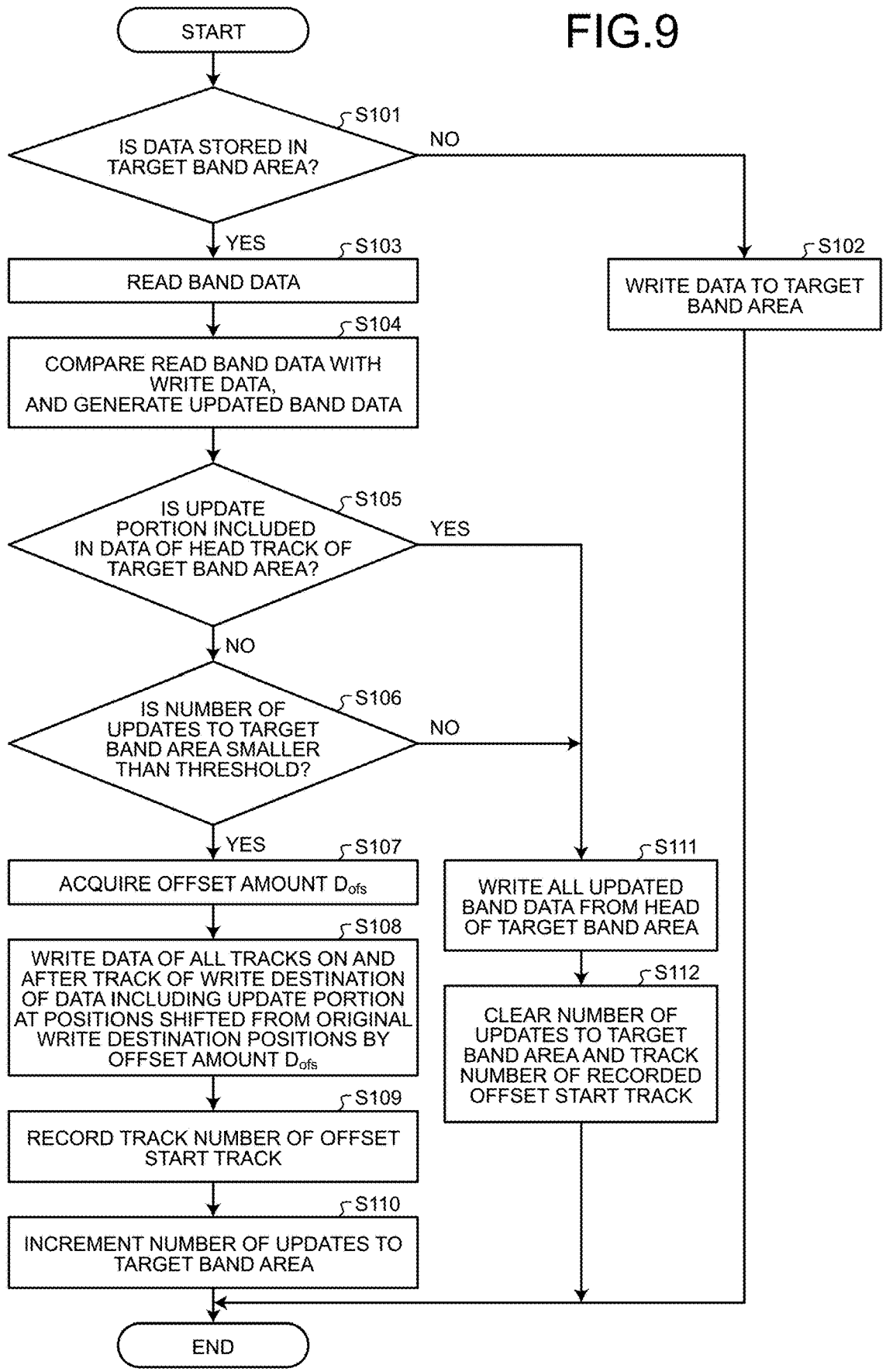

MAGNETIC DISK APPARATUS AND METHOD

CROSS-REFERENCE TO RELATED APPLICATIONS

This application is based upon and claims the benefit of priority from Japanese Patent Application No. 2024-003697, filed on Jan. 15, 2024; the entire contents of which are incorporated herein by reference.

FIELD

Embodiments described herein relate generally to a magnetic disk apparatus and a method.

BACKGROUND

For a magnetic disk apparatus, a recording scheme called shingled magnetic recording (SMR) has been known. According to SMR, a track pitch can be made narrower than a width of a write head, thereby improving recording density.

BRIEF DESCRIPTION OF THE DRAWINGS

FIG. 8 is a diagram for describing an example of an operation of updating data from a track in the middle of one band area executed in the magnetic disk apparatus according to the embodiment; and FIG. 9 is a flowchart illustrating an example of a data write operation executed in the magnetic disk apparatus according to the embodiment.

DETAILED DESCRIPTION

According to the present embodiment, a magnetic disk apparatus includes a magnetic disk and a controller. The magnetic disk includes a first storage area where multiple first tracks are provided. The multiple first tracks are tracks on which data is written by a shingled magnetic recording (SMR) scheme. A direction of writing data by the SMR scheme on the multiple first tracks is to a direction from a second track to a third track. The second track is one of the multiple first tracks and is closest to a first end that is one end in a radial direction of the first storage area. The third track is another one of the multiple first tracks and is closest to a second end that is another end in the radial direction of the first storage area. The controller is configured to read first data that is data stored in the multiple first tracks, and update second data that is the read first data with third data that is data received from a host. When an updated portion of fourth data being the updated second data is not included in data for the second track, the controller writes, to offset positions, pieces of the fourth data for tracks from a fourth track to the third track. The fourth track is one of the multiple first tracks serving as a write destination of data including the updated portion. The offset positions are obtained by shifting a position of each of the tracks from the fourth track to the third track by a first amount in a direction to the second end.

Hereinafter, a magnetic disk apparatus and a method according to an embodiment will be described in detail with reference to the accompanying drawings. Note that the present invention is not limited by this embodiment.

Embodiment

Figure 1:
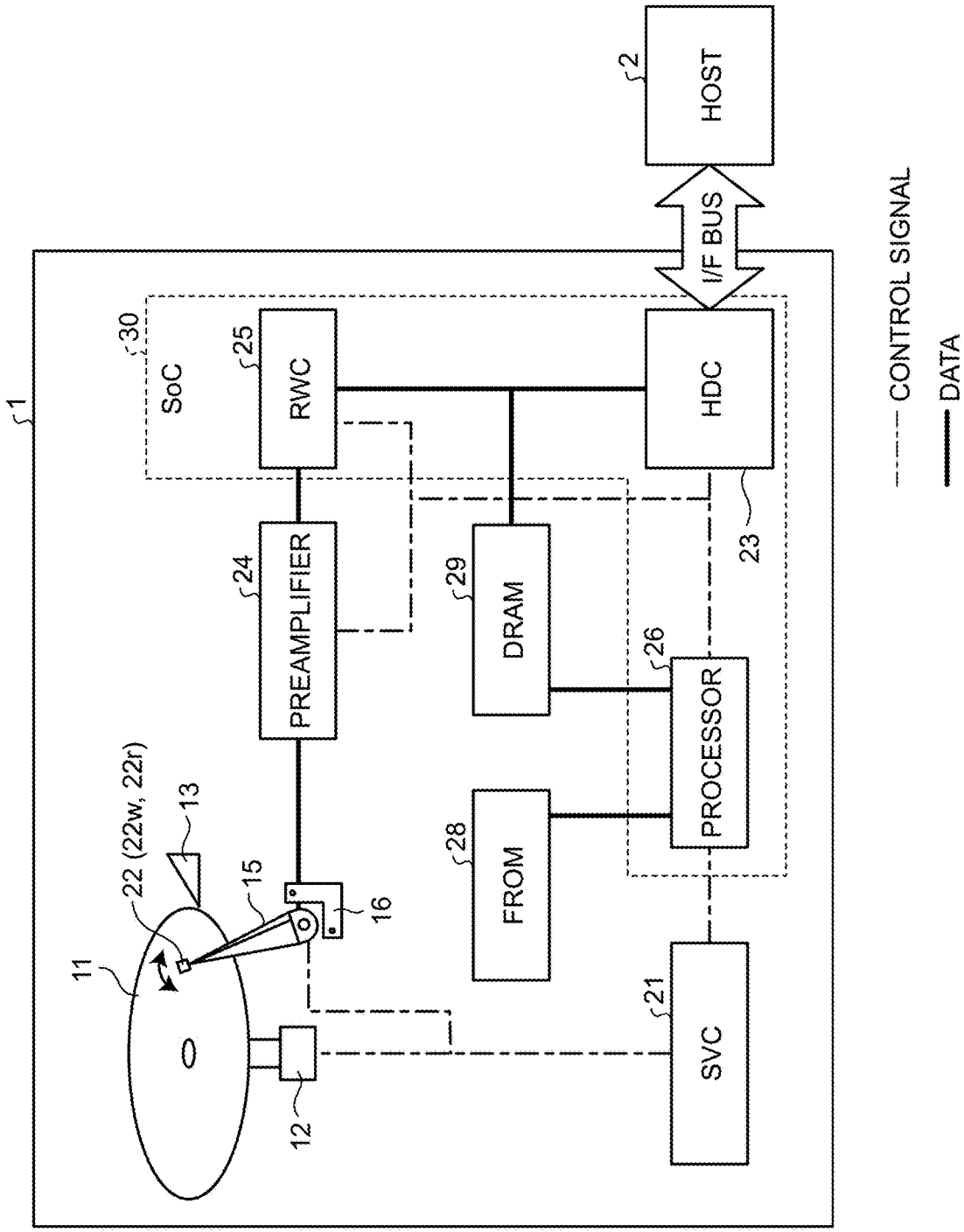
FIG. 1 is a diagram illustrating an example of a configuration of a magnetic disk apparatus according to an embodiment.

FIG. 1 is a diagram illustrating an example of a configuration of a magnetic disk apparatus 1 according to an embodiment.

The magnetic disk apparatus 1 is connected to a host 2. The magnetic disk apparatus 1 can receive an access command from the host 2. Examples of the access command include a write command and a read command.

The magnetic disk apparatus 1 includes a magnetic disk 11 on which a magnetic layer is formed. The magnetic disk apparatus 1 accesses the magnetic disk 11 in response to the access command. Examples of the access include writing of data and reading of data.

Data is written and read by a magnetic head 22. The magnetic disk apparatus 1 includes, in addition to the magnetic disk 11, a spindle motor (SPM) 12, a ramp 13, an actuator arm 15, a voice coil motor (VCM) 16, a servo controller (SVC) 21, the magnetic head 22, a hard disk controller (HDC) 23, a preamplifier 24, a read/write channel (RWC) 25, a processor 26, a flash read only memory (FROM) 28, and a dynamic random access memory (DRAM) 29.

The magnetic disk 11 is rotated at a predetermined speed of rotation by the SPM12 that is attached coaxially.

The SVC21 is an integrated circuit having a function as a driver that drives the SPM12 and the VCM16. The processor 26 controls rotation of the SPM12 and rotation of the VCM16 via the SVC21.

The magnetic head 22 performs writing and reading on the magnetic disk 11 by a write head 22w and a read head 22r provided therein. The magnetic head 22 is attached to a distal end of the actuator arm 15. The magnetic head 22 is moved in a radial direction of the magnetic disk 11 by the VCM16 driven by the SVC21. Note that one or both of the write head 22w and the read head 22r included in the magnetic head 22 may be provided plurally per magnetic head 22.

When, for example, the rotation of the magnetic disk 11 is stopped, the magnetic head 22 is moved onto the ramp 13. The ramp 13 is configured to hold the magnetic head 22 at a position spaced apart from the magnetic disk 11.

The preamplifier 24 is an integrated circuit that writes and reads data via the magnetic head 22. The preamplifier 24 amplifies and outputs a signal read from the magnetic disk 11 by the magnetic head 22 and supplies the signal to the RWC 25 during the read operation. In addition, the preamplifier 24 amplifies a signal corresponding to data to be written supplied from the RWC 25 and supplies the signal to the magnetic head 22 during the write operation.

The HDC 23 controls transmission and reception of data with the host 2 via an I/F bus, controls the DRAM 29, and the like.

The DRAM 29 is used as a buffer for data to be transmitted to and received from the host 2. The DRAM 29 is used for temporarily storing data to be written or data read from the magnetic disk 11.

Additionally, the DRAM 29 is used as an operation memory by the processor 26. The DRAM 29 is used as an area on which a firmware program is loaded and an area in which various pieces of data are temporarily stored. In particular, the DRAM 29 is used as a buffer for performing data transfer between the host 2 and the magnetic disk 11.

The RWC 25 modulates data to be written that is supplied from the HDC 23, and supplies the modulated data to the preamplifier 24. In addition, the RWC 25 performs demodulation including error correction on a signal supplied from the preamplifier 24 after being read from the magnetic disk 11, and then outputs the signal to the HDC 23 as digital data.

The processor 26 is, for example, a central processing unit (CPU). The flash read only memory (FROM) 28 and the DRAM 29 are connected to the processor 26.

The FROM 28 stores a firmware program, various pieces of setting information, etc. Note that the firmware program may be stored in the magnetic disk 11.

The processor 26 performs overall control of the magnetic disk apparatus 1 in accordance with the firmware program stored in the FROM 28 or the magnetic disk 11. In one example, the processor 26 loads the firmware program from the FROM 28 or the magnetic disk 11 onto the DRAM 29, and executes control of the SVC 21, the preamplifier 24, the RWC 25, the HDC 23, and so forth, in accordance with the firmware program loaded onto the DRAM 29.

Note that some of or all the functions of the processor 26 may be implemented by a hardware circuit such as a field-programmable gate array (FPGA) or an application specific integrated circuit (ASIC).

The HDC 23, the RWC 25, and the processor 26 are configured as a system-on-a-chip (SoC) 30 that is one integrated circuit. In addition to these elements, the SoC 30 may include other elements (for example, the FROM 28, the DRAM 29, or the like). The SoC 30 is an example of a controller.

Figure 2:
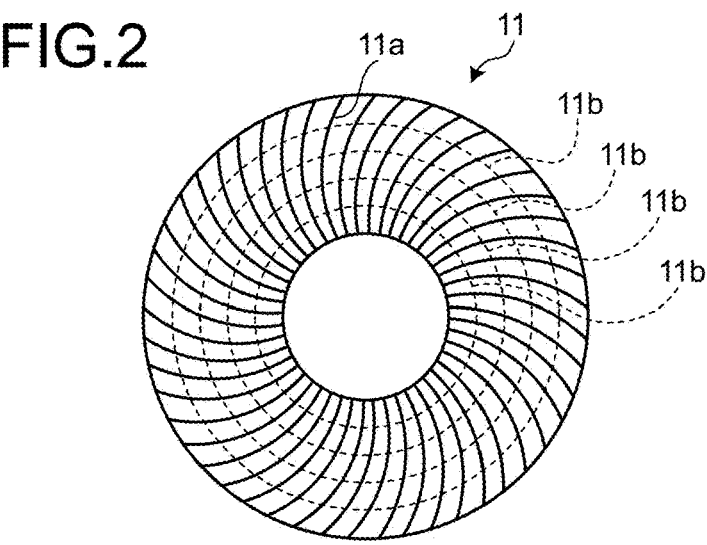
FIG. 2 is a diagram illustrating an example of a configuration of a magnetic disk according to the embodiment.

FIG. 2 is a diagram illustrating an example of a configuration of the magnetic disk 11 according to the embodiment. Servo information is written to the magnetic layer formed on the surface of the magnetic disk 11 by, for example, a servo writer before shipment. The servo information may be written to the magnetic layer by self-servo write. The servo information includes sector/cylinder information, a burst pattern, and a post code. The sector/cylinder information represents servo addresses in a circumferential direction and the radial direction of the magnetic disk 11. The burst pattern represents an amount of positional deviation of the magnetic head 22 from a position indicated by the servo address. The post code is data for correcting repeatable runout (RRO). The SoC 30 reads the servo information by using the magnetic head 22 and executes a seek operation and a tracking operation on the basis of the read servo information. The seek operation is an operation of moving the magnetic head 22 in the radial direction. The tracking operation is an operation of maintaining the magnetic head 22 on a target track. Note that the servo information may be written on the magnetic disk 11 after shipment by self-servo write (SSW).

FIG. 2 illustrates servo zones 11a arranged radially as an example of arrangement of servo zones in which the servo information is written. A plurality of concentric tracks 11b is provided at a predetermined pitch in the radial direction of the magnetic disk 11. A large number of sectors are continuously formed on a circumference of each track 11b. Data is written and read by the magnetic head 22 for each sector.

As a recording scheme, namely, a scheme of writing data on the magnetic disk 11, there are several types of recording schemes. Those recording schemes include conventional magnetic recording (CMR) and SMR.

Figure 3:
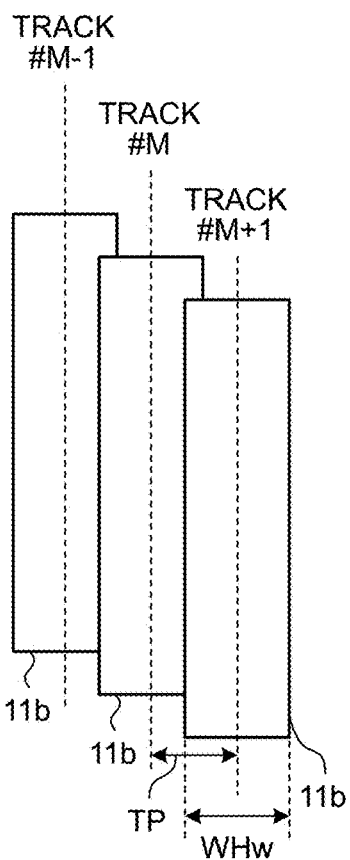
FIG. 3 is a diagram for describing SMR according to the embodiment.

FIG. 3 is a diagram for describing SMR according to the embodiment. In SMR, data (referred to as first data) for a first track 11b is written, and thereafter, data (referred to as second data) for a second track 11b adjacent to the first track 11b in the radial direction is written. The second data is written so as to overlap with part of the first data. In other words, according to SMR, data for one of two tracks 11b adjacent to each other in the radial direction of the magnetic disk 11 is written so as to overlap with part of data written to the other one of the two tracks 11b.

In FIG. 3, as three tracks 11b, a track #M−1, a track #M, and a track #M+1 are depicted. The track #M−1 and the track #M are adjacent to each other. The track #M and the track #M+1 are adjacent to each other. In this example, data of the track #M−1, data of the track #M, and data of the track #M+1 are written in this order. The data of the track #M is written so as to overlap with part of the data of the track #M−1 in the radial direction. The data of the track #M+1 is written so as to overlap with part of the data of the track #M in the radial direction. Thus, according to SMR, data of one track 11b repeatedly overlaps with part of data of the adjacent track 11b to which the data has already been written.

According to SMR, since the data is written by the above-described method, a track pitch TP is made narrower than an element width ($WH_W$) of the write head 22w of the magnetic head 22. As a result, recording density is improved.

However, according to SMR, the track pitch TP is narrow, so that it is susceptible to adjacent track erasure (ATE). Therefore, in principle, pieces of data for a plurality of tracks 11b continuous in the radial direction are collectively updated. An area of the plurality of tracks 11b to be collectively updated is referred to as a band area. The update can be rephrased as a change or rewriting. The band area is an example of the first storage area and a second storage area.

In addition, according to SMR, data for one track 11b is written so as to overlap with part of data that has been already written to the adjacent track 11b. Therefore, data can be written in only either one of a direction from an inner side to an outer side and a direction from the outer side to the inner side with respect to the plurality of continuous tracks 11b. An order of writing on those tracks 11b continuous in the radial direction may be common in all band areas, or may be determined for each band area.

Figure 4:
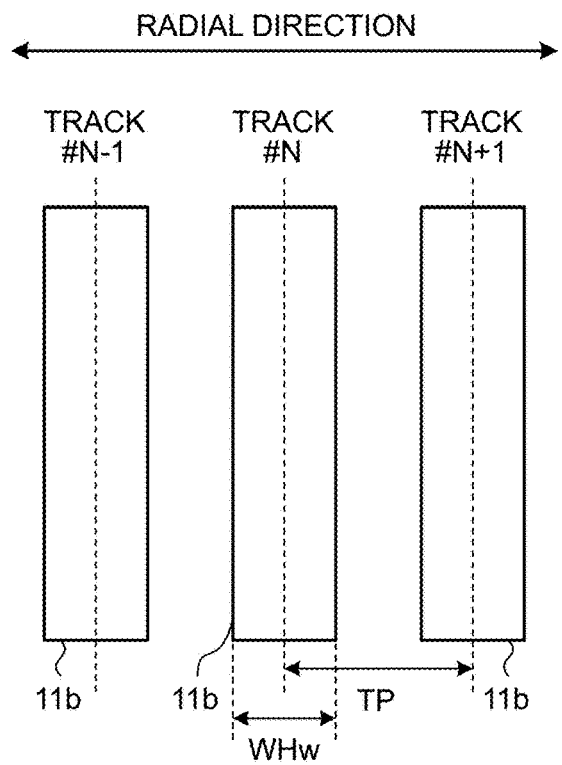
FIG. 4 is a diagram for describing CMR according to the embodiment.

FIG. 4 is a diagram for describing CMR according to the embodiment. As illustrated in the drawing, according to CMR, data of each track 11b is arranged so as not to overlap with data of another track 11b adjacent in the radial direction. In other words, CMR is a scheme that pieces of data for two tracks 11b adjacent to each other in the radial direction of the magnetic disk 11 are written so as not to overlap with each other.

In FIG. 4, a track #N−1, a track #N, and a track #N+1 are drawn as three tracks 11b. The track #N−1 and the track #N are disposed apart from each other in the radial direction. The track #N and the track #N+1 are disposed apart from each other in the radial direction. Accordingly, the track

N−1, the track #N, and the track #N+1 are disposed such that pieces of data of two adjacent tracks 11b do not overlap with each other.

According to CMR, the track pitch TP is the same as or larger than the element width ($WH_w$) of the write head 22w, so that data at an optional position can be updated. Therefore, according to CMR, random access performance is enhanced.

Figure 5:
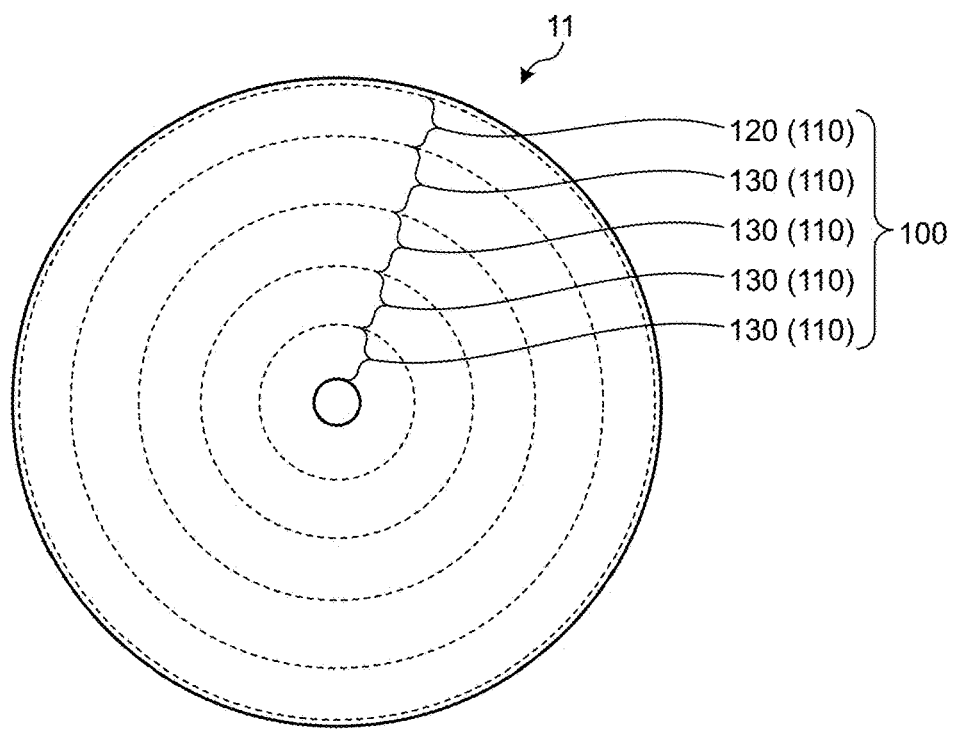
FIG. 5 is a diagram illustrating an example of multiple band areas provided in the magnetic disk according to the embodiment.
Figure 6:
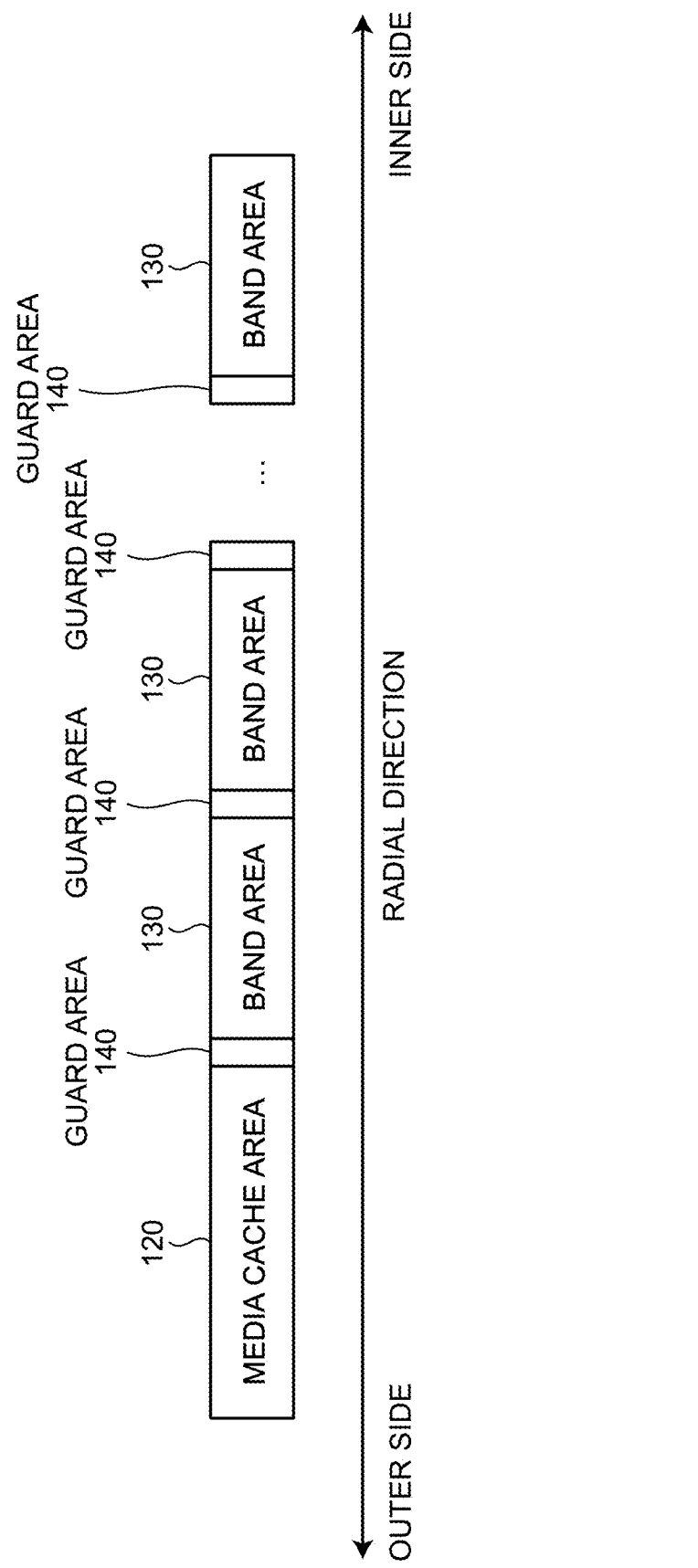
FIG. 6 is another diagram illustrating an example of the multiple band areas provided in the magnetic disk according to the embodiment.

FIGS. 5 and 6 are diagrams illustrating examples of a plurality of band areas provided in the magnetic disk 11 according to the embodiment.

A recording surface 100 of the magnetic disk 11, namely, an area where the tracks 11b can be disposed, is divided into storage areas 110 in the radial direction. The storage areas 110 include one media cache area 120 and multiple band areas 130. An area called a guard area 140, which cannot be designated as a write destination from the host 2, is provided between the storage areas 110.

The storage area 110 provided on an outermost side in the radial direction in the recording surface is specified as the media cache area 120. The media cache area 120 is a storage area used as a temporary storage location of data. In the media cache area 120, data is written by CMR. Note that a position of the media cache area 120 is not limited to the outermost side. In addition, two or more media cache areas 120 may be provided on the recording surface.

Two or more of the storage areas 110 are specified as the band areas 130. Each band area 130 is provided with the tracks 11b. In each band area 130, data is written to all the tracks 11b by the SMR scheme. When data is written to each band area 130, it is prohibited to write data to an adjacent band area 130 beyond the guard area 140 from a band area 130 as a write destination.

A logical address usable by the host 2 is mapped to each band area 130. Therefore, each band area 130 is a final storage position of data to be written (referred to as write data) requested by the host 2. Note that the band areas 130 may include a band area 130 to which a logical address usable by the host 2 is not mapped.

When writing is performed on all the tracks 11b in one band area 130, a track 11b on which data is written first is referred to as a head track of the band area 130, and a track 11b on which data is written last is referred to as an end track of the band area 130. In all the tracks 11b in one band area 130, tracks 11b other than the head track and the end track are each referred to as a track 11b in the middle of the band area 130. In one band area 130, tracks 11b from a certain track 11b (referred to as a first track 11b) located in the middle of the band area 130 to the end track of this band area 130 may be referred to as the first track and subsequent tracks of the band area 130.

Out of two edges in the radial direction of one band area 130, an edge on a side where the head track of this band area 130 is disposed is referred to as a head of the band area 130. Out of two edges in the radial direction of one band area 130, an edge opposite to the head is referred to as an end. In one band area 130, a track 11b adjacent to the first track 11b on a head side of the band area 130 is referred to as a track 11b immediately before the first track 11b. In one band area 130, a track 11b adjacent to the first track 11b on an end side of the band area 130 is referred to as a track 11b immediately after the first track 11b.

As described above, according to SMR, in principle, data is updated in units of the band area 130. However, in a case where an update portion is included only in data on a track 11b in the middle of the band area 130 and subsequent tracks 11b, it can be considered that it is unnecessary to update one or more consecutive tracks 11b on the head side not including the update portion.

Therefore, in the embodiment, in a case where the update portion is not included in data for one or more consecutive tracks 11b on the head side of the band area 130, the SoC 30 does not update these one or more tracks 11b. With this configuration, time required for the update is reduced as compared with a case where data is updated in units of the band area 130. Therefore, performance of writing is improved.

Figure 7:
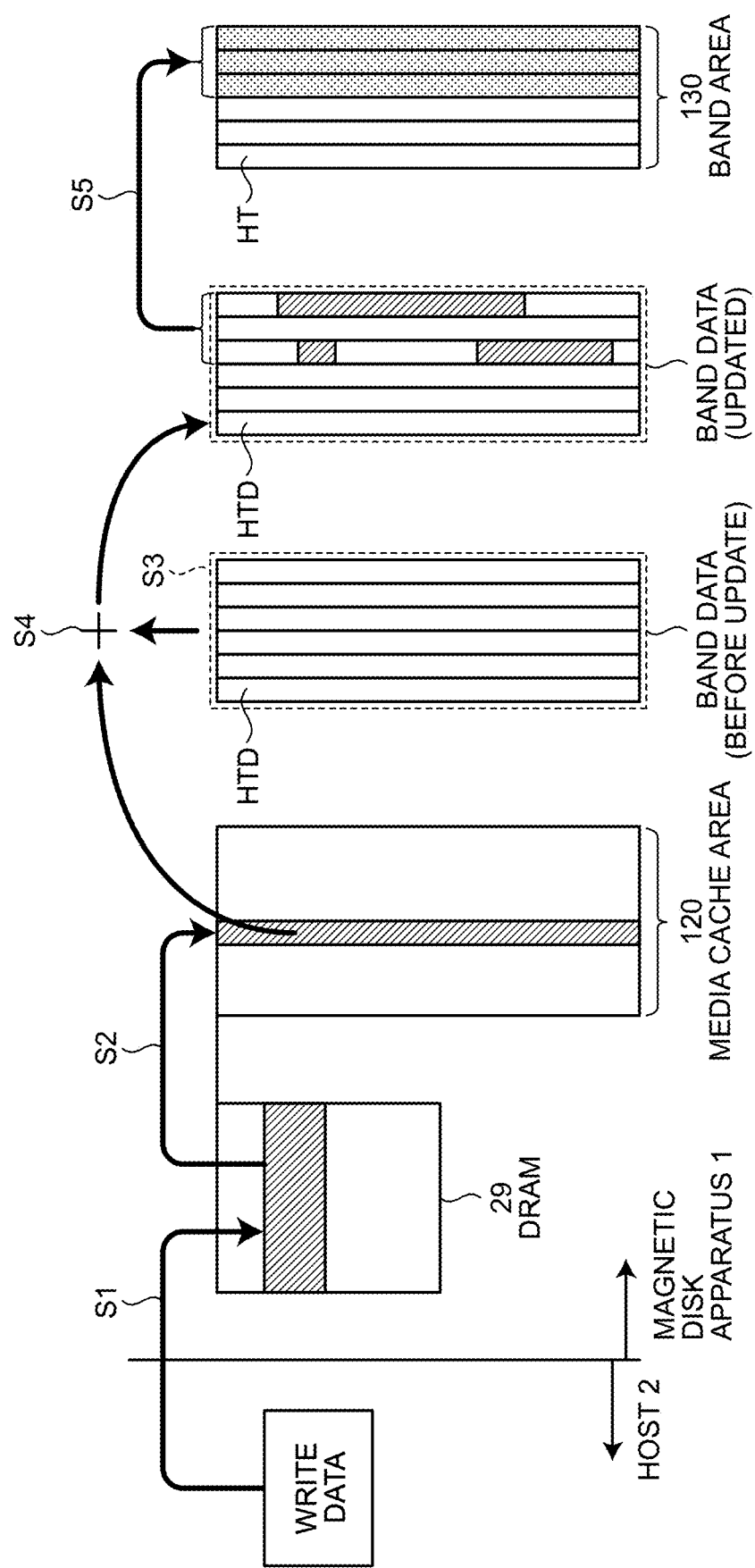
FIG. 7 is a diagram for describing an example of an operation when data is written from a host executed in the magnetic disk apparatus of the embodiment.

FIG. 7 is a diagram for describing an example of an operation when data is written from the host 2 executed in the magnetic disk apparatus 1 of the embodiment.

In the magnetic disk apparatus 1, write data received from the host 2 is first stored in the DRAM 29 by the HDC 23 (S1). A buffer area is allocated in advance to the DRAM 29. In Step S1, the write data is stored in this buffer area.

Subsequently, in order to prevent the buffer area from becoming empty or the write data on the DRAM 29 from being lost from the magnetic disk apparatus 1 due to power interruption or the like, the write data is transferred from the DRAM 29 to the media cache area 120 (S2). At this time, the write data is written to the media cache area 120 by the CMR scheme with high random access performance.

Thereafter, all data is read from the band area 130 as a final write destination of the write data (S3). All the data of one band area 130 is referred to as band data. The band data read in Step S3 may be temporarily stored in the DRAM 29 or may be temporarily stored in the media cache area 120. The band data read in S3 is referred to as band data before update.

Note that, in FIG. 7, six tracks 11b are provided in the band area 130 that is a final storage destination of the write data, and pieces of data for those tracks 11b constituting the band data are arranged in an order of arrangement of the tracks 11b. The head track of the band area 130 is referred to as a head track HT, and data of the head track HT is referred to as head track data HTD.

The band data before update is compared with the write data temporarily stored in the media cache area 120, whereby updated band data is generated (S4). At this time, a portion that has been updated (hereinafter referred to as an update portion) included in the updated band data is checked. In FIG. 7, a hatched portion of the updated band data indicates the update portion.

In the example illustrated in FIG. 7, the update portion is not included in data for three consecutive tracks 11b from the head track HT to the third track, and the update portion is included in data for three tracks 11b from the fourth to sixth tracks. Therefore, the data for the three tracks 11b from the fourth track 11b to the sixth track that is the end track is written to the band area 130 in an overwriting format (S5). At this time, data is not written to three consecutive tracks 11b from the head track HT. Thus, writing for updating data is started from the fourth track 11b, and thereafter, writing for updating is executed for the fifth track 11b and the sixth track 11b as the end track in this order.

As described above, in a case where the update portion is not included in the data for one or more consecutive tracks 11b from the head track HT, the update is not performed for all the tracks 11b of the band area 130, but is performed for part of the tracks 11b (e.g., the three tracks 11b from the fourth to sixth tracks in FIG. 7) including the update portion.

Moreover, in the embodiment, when starting the update from a track 11b in the middle of one band area 130, the SoC 30 offsets a position of each one of tracks 11b, which are the track 11b from which the update is started and subsequent tracks 11b, to the end side by a predetermined amount.

After the update is started from the track 11b in the middle of one band area 130, a track 11b (referred to as a second track 11b) immediately before the track 11b from which the update is started is affected by ATE, and it may be difficult to read data of the second track 11b. When the data of the second track 11b is difficult to be read, retry of reading occurs at the time of reading the data of the second track 11b, which may deteriorate read performance.

According the present embodiment, a position of a track 11b from which the update is started and a position of subsequent track(s) 11b are offset (or shifted) in a direction to the end of the band area 130. Therefore, the influence of ATE received by the second track 11b can be reduced, and the deterioration of the read performance caused by the retry of the reading of the data of the second track 11b can be suppressed.

FIG. 8 is a diagram for describing an example of an operation of updating data from the track 11b in the middle of one band area 130 executed in the magnetic disk apparatus 1 of the embodiment.

In the example illustrated in FIG. 8, six tracks 11b are provided in the band area 130. The data HTD of the head track HT is denoted as data TD #1, the data of the second track 11b is denoted as data TD #2, the data of the third track 11b is denoted as data TD #3, the data of the fourth track 11b is denoted as data TD #4, the data of the fifth track 11b is denoted as data TD #5, and the data of the sixth track 11b is denoted as data TD #6. The sixth track 11b corresponds to the end track.

In this example, a case where update is started from the fourth track 11b is illustrated. In such a case, the data TD #4 of the fourth track 11b is written at a position that has been offset by $D_{ofs}$ in the end direction from an original position of the fourth track 11b. Subsequently, the data TD #5 of the fifth track 11b is written at a position that has been offset by $D_{ofs}$ in the end direction from an original position of the fifth track 11b. The data TD #6 of the sixth track 11b as the end track is written at a position that has been offset by $D_{ofs}$ in the end direction from an original position of the sixth track 11b.

The original position of a track 11b refers to a position of the track 11b when the position has never been offset. The original position of the track 11b is set in advance.

The offset amount $D_{ofs}$ is set so as to reduce an influence of ATE received by the track 11b immediately before the track 11b on which the offset has been started. Note that the offset amount $D_{ofs}$ is set such that the data of the end track is not written to the adjacent band area 130 beyond the guard area 140 even if the offset is performed for the end track.

In one example, the offset amount $D_{ofs}$ is set for each individual band area 130. The band areas 130 are thus individually given a value of the offset amount $D_{ofs}$. A positional relationship between the read head 22r and the write head 22w provided in the magnetic head 22 changes according to a skew angle of the magnetic head 22. The track pitch TP and linear recording density are determined according to a radial position of the magnetic disk 11, manufacturing variations of the magnetic disk 11, manufacturing variations of the magnetic head 22, and the like. Therefore, the influence of ATE may vary with the magnetic head 22, the radial position, and the like. The offset amount $D_{ofs}$ is set for each individual band area 130 on the basis of these factors affecting the influence of ATE.

Note that a common value may be set as the offset amount $D_{ofs}$ for all the band areas 130.

FIG. 9 is a flowchart illustrating an example of a data write operation executed in the magnetic disk apparatus 1 according to the embodiment. The band area 130 of the write destination is referred to as a target band area 130. In addition, it is assumed that the write data is stored in the media cache area 120.

First, the SoC 30 determines whether data has already been stored in the target band area 130 (S101). When no data is stored in the target band area 130 (S101: No), namely, when the target band area 130 is in an empty state, the SoC 30 writes the write data in the media cache area 120 to the target band area 130 (S102), and ends the write operation.

When data has already been stored in the target band area 130 (S101: Yes), the SoC 30 starts updating band data for the target band area 130.

Specifically, the SoC 30 reads the band data from the target band area 130 (S103). The SoC 30 compares the read band data with the write data and generates updated band data (S104).

A temporary storage location of the read band data and a location where the updated band data is generated are not limited to a specific location. In one example, the read band data and the updated band data are temporarily stored in the DRAM 29 or the media cache area 120.

Subsequent to the processing of S104, the SoC 30 determines whether or not an update portion is included in data for a head track of the target band area 130 (S105). When the update portion is not included in the data for the head track of the target band area 130 (S105: No), the SoC 30 determines whether the number of updates to the target band area 130 is smaller than a threshold (S106).

As described above, when starting the update from a track 11b in the middle of one band area 130, the SoC 30 offsets the position of the track 11b from which the update is started and the positions of subsequent tracks 11b, thereby suppressing the influence of ATE received by the track 11b immediately before the track 11b on which the update is started. However, if the update from the track 11b in the middle of one band area 130 is executed many times, there is a possibility that the influence of ATE received by the track 11b from which the update is started is accumulated, and it may be difficult to read the data of the track 11b immediately before the track 11b from which the update is started. Therefore, in the embodiment, the number of executions of the update from the track 11b in the middle of one band area 130 is limited by the threshold that is set in advance.

When the number of updates to the target band area 130 is smaller than the threshold (S106: Yes), the SoC 30 acquires an offset amount $D_{ofs}$ set for the target band area 130 (S107). The SoC 30 writes data for the tracks 11b serving as the write destination of the data including the update portion out of all the tracks 11b of the target band area 130, to positions that have been offset (or shifted) from original positions toward the end side by the offset amount $D_{ofs}$ (S108). Then, the SoC 30 records a track number of an offset start track at a predetermined position (S109).

The offset start track is a track 11b, in the target band area 130, closest to the head of the band area 130 among the tracks 11b of the data written at the positions shifted (or offset) from the original positions toward the end side by the offset amount $D_{ofs}$. In one example, when the processing of S108 is executed for a band area 130 multiple times, the track 11b closest to the head of the band area 130 among the tracks 11b of the data written at the positions shifted from the original positions toward the end side by the offset amount $D_{ofs}$ in the processing of S108 executed the multiple times is set as the offset start track. Therefore, in S109, when the track 11b closer to the head than the track 11b already recorded as the offset start track is updated, a track number of the recorded offset start track is updated. When the track 11b closer to the end than the track 11b already recorded as the offset start track is updated, the track number of the recorded offset start track is not updated.

Subsequent to the processing of S109, the SoC 30 increments the number of updates to the target band area 130 by one (S110). Then, the write operation ends.

When the update portion is included in the data for the head track of the target band area 130 (S105: Yes), or when the number of updates to the target band area 130 is not smaller than the threshold (S106: No), the SoC 30 writes the updated band data from the head of the target band area 130 (S111). Then, the SoC 30 clears the number of updates to the target band area 130 and the track number of the recorded offset start track (S112), and ends the write operations.

By the operation illustrated in FIG. 9, pieces of data for the tracks 11b on and after the offset start track in each band area 130 are written to offset positions shifted from the original position in the end direction of the band area 130 by the offset amount $D_{ofs}$. Therefore, when reading data from the track 11b on and after the offset start track, the SoC 30 identifies a position of the data to be read on the basis of the original position of the track 11b on which the data to be read is written and the offset amount $D_{ofs}$. Specifically, the SoC 30 identifies a position shifted in the end direction of the band area 130 by the offset amount $D_{ofs}$ from the original position of the track 11b on which the data to be read is written as the position of the data to be read.

Note that, in the operation example illustrated in FIG. 9, in a case where the update is started from the track 11b in the middle of the band area 130, the offset amount from the original position of the track 11b is $D_{ofs}$ even if the update is performed for the second time or later. At the time of updating the track 11b already shifted from the original position, the SoC 30 may write data at a position further shifted by the offset amount $D_{ofs}$ from the position of the track 11b immediately before the update.

As described above, according to the embodiment, the SoC 30 reads the band data from the band area 130 and updates the read band data with the write data (see, for example, S103 and S104 in FIG. 9). When the update portion of the updated band data is not included in data for the head track (for example, when it is determined as No in S105 of FIG. 9), the SoC 30 operates as follows. The SoC 30 writes data for tracks 11b from a track as the write destination of data including the update portion to subsequent tracks by shifting the position of each one of the tracks; the start track 11b to the end track, by the offset amount $D_{ofs}$ in the direction to the end of the band area 130.

Time required for the update is reduced as compared with the case where the data is updated in units of the band area 130, so that performance of writing is improved. Moreover, an influence of ATE received by the track 11b immediately before the track 11b on which the update has been started can be reduced, and deterioration of read performance due to retry of reading can be suppressed. Thus, data can be suitably written to the magnetic disk.

In addition, according to the embodiment, when the number of executing the update from the track 11b in the middle of the band area 130 reaches the threshold (for example, when it is determined as No in S106 of FIG. 9), the SoC 30 writes the updated band data at the original position of each track 11b.

Therefore, it is possible to suppress accumulation of the influence of ATE received by the track 11b immediately before the track 11b whose update has been started and difficulty of reading data from the track 11b.

Note that, according to the embodiment, even when the update portion of the updated band data is included in data for the head track (for example, in response to determining to be Yes in S105 of FIG. 9), the SoC 30 writes the updated band data at the original position of each track 11b.

In addition, according to the embodiment, when reading data (referred to as third data) stored in any one of the tracks 11b from the track 11b on which the update has been started to the end track, the SoC 30 identifies a position of the third data on the basis of an original position of the track 11b in which the third data is stored and the offset amount $D_{ofs}$.

Therefore, the SoC 30 can read data written at a position deviated from the original position.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A magnetic disk apparatus comprising:
a magnetic disk including a first storage area where multiple first tracks are provided, the multiple first tracks being tracks on which data is written by a shingled magnetic recording (SMR) scheme, a direction of writing data by the SMR scheme on the multiple first tracks being set to a direction from a second track to a third track, the second track being one of the multiple first tracks and being closest to a first end being one end in a radial direction of the first storage area, the third track being another one of the multiple first tracks and being closest to a second end being another end in the radial direction of the first storage area; and
a controller configured to
read first data being data stored in the multiple first tracks,
update second data being the read first data with third data being data received from a host, and,
when an updated portion of fourth data being the updated second data is not included in data for the second track, write, to offset positions, pieces of the fourth data for tracks from a fourth track to the third track, the fourth track being one of the multiple first tracks serving as a write destination of data including the updated portion, the offset positions being obtained by shifting a position of each of the tracks from the fourth track to the third track by a first amount in a direction to the second end.

2. The magnetic disk apparatus according to claim 1, wherein, when reading fifth data being data stored in a fifth track being one of the multiple first tracks included in the fourth track to the third track, the controller identifies a position of the fifth data on a basis of an original position of the fifth track and the first amount.

3. The magnetic disk apparatus according to claim 1, wherein, when a number of executions of writing from one of the multiple first tracks closer to the second end than the second track reaches a threshold, the controller writes data for the multiple first tracks at original positions of the multiple first tracks.

4. The magnetic disk apparatus according to claim 2, wherein, when a number of executions of writing from one of the multiple first tracks closer to the second end than the second track reaches a threshold, the controller writes data for the multiple first tracks at original positions of the multiple first tracks.

5. The magnetic disk apparatus according to claim 1, wherein, when the updated portion is included in the data for the second track, the controller writes data for the multiple first tracks at original positions of the multiple first tracks.

6. The magnetic disk apparatus according to claim 2, wherein, when the updated portion is included in the data for the second track, the controller writes data for the multiple first tracks at original positions of the multiple first tracks.

7. The magnetic disk apparatus according to claim 1, wherein
the magnetic disk includes multiple second storage areas each having a same configuration as the first storage area, and
the multiple second storage areas are individually given a value of the first amount.

8. The magnetic disk apparatus according to claim 2, wherein
the magnetic disk includes multiple second storage areas each having a same configuration as the first storage area, and
the multiple second storage areas are individually given a value of the first amount.

9. The magnetic disk apparatus according to claim 3, wherein
the magnetic disk includes multiple second storage areas each having a same configuration as the first storage area, and
the multiple second storage areas are individually given a value of the first amount.

10. The magnetic disk apparatus according to claim 5, wherein
the magnetic disk includes multiple second storage areas each having a same configuration as the first storage area, and
the multiple second storage areas are individually given a value of the first amount.

11. A method comprising:
writing data to multiple first tracks provided in a first storage area of a magnetic disk by an SMR scheme, a direction of writing data by the SMR scheme on the multiple first tracks being set to a direction from a second track to a third track, the second track being one of the multiple first tracks and being closest to a first end being one end in a radial direction of the first storage area, the third track being another one of the multiple first tracks and being closest to a second end being another end in the radial direction of the first storage area;
reading first data being data stored in the multiple first tracks;
updating second data being the read first data with third data being data received from a host; and,
when an updated portion of fourth data being the updated second data is not included in data for the second track, writing, to offset positions, pieces of the fourth data for tracks from a fourth track to the third track, the fourth track being one of the multiple first tracks serving as a write destination of data including the updated portion, the offset positions being obtained by shifting a position of each of the tracks from the fourth track to the third track by a first amount in a direction to the second end.

12. The method according to claim 11, further comprising, when reading fifth data being data stored in a fifth track being one of the multiple first tracks included in the fourth track to the third track, identifying a position of the fifth data on a basis of an original position of the fifth track and the first amount.

13. The method according to claim 11, further comprising, when a number of executions of writing from one of the multiple first tracks closer to the second end than the second track reaches a threshold, writing data for the multiple first tracks at original positions of the multiple first tracks.

14. The method according to claim 12, further comprising, when a number of executions of writing from one of the multiple first tracks closer to the second end than the second track reaches a threshold, writing data for the multiple first tracks at original positions of the multiple first tracks.

15. The method according to claim 11, further comprising, when the updated portion is included in the data for the second track, writing data for the multiple first tracks at original positions of the multiple first tracks.

16. The method according to claim 12, further comprising, when the updated portion is included in the data for the second track, writing data for the multiple first tracks at original positions of the multiple first tracks.

17. The method according to claim 11, wherein
the magnetic disk includes multiple second storage areas each having a same configuration as the first storage area, and
the multiple second storage areas are individually given a value of the first amount.

18. The method according to claim 12, wherein
the magnetic disk includes multiple second storage areas each having a same configuration as the first storage area, and
the multiple second storage areas are individually given a value of the first amount.

19. The method according to claim 13, wherein
the magnetic disk includes multiple second storage areas each having a same configuration as the first storage area, and
the multiple second storage areas are individually given a value of the first amount.

20. The method according to claim 15, wherein
the magnetic disk includes multiple second storage areas each having a same configuration as the first storage area, and
the multiple second storage areas are individually given a value of the first amount.

* * * * *